United States Patent [19]

Saegusa

[11] 4,442,688

[45] Apr. 17, 1984

[54] VEHICLE STEERING LOCK ARRANGEMENT

[75] Inventor: Nobuo Saegusa, Zama, Japan

[73] Assignee: Nissan Motor Company, Limited, Yokohama, Japan

[21] Appl. No.: 377,808

[22] Filed: May 13, 1982

[30] Foreign Application Priority Data

Jun. 11, 1981 [JP] Japan .................................. 56-89994

[51] Int. Cl.³ .......................... B62D 1/18; E05B 65/12
[52] U.S. Cl. ........................................ 70/252; 70/253; 280/775
[58] Field of Search .................. 70/252, 237, 253–255; 280/775

[56] References Cited

FOREIGN PATENT DOCUMENTS 57-205255 12/1982 Japan ...................................... 70/253
2101545 1/1983 United Kingdom .................. 70/253

Primary Examiner—Gary L. Smith
Assistant Examiner—Lloyd A. Gall
Attorney, Agent, or Firm—Lane, Aitken & Kananen

[57] ABSTRACT

A steering lock arrangement for a vehicle with a tilt steering wheel includes a stationary instrument panel, a key-receiving member, and a shielding member. The instrument panel has an aperture. The key-receiving member is associated with the steering wheel and moves with tilt of the steering wheel. The key-receiving member has a slot for an operating key and is located at the back of the instrument panel in such a manner that the slot faces the aperture. The shielding member is connected to the key-receiving member and engages the instrument panel in such a manner to cover the gap between the key-receiving member and the instrument panel. The shielding member is movable to permit movement of the key-receiving member.

10 Claims, 4 Drawing Figures

FIG.3
FIG.4
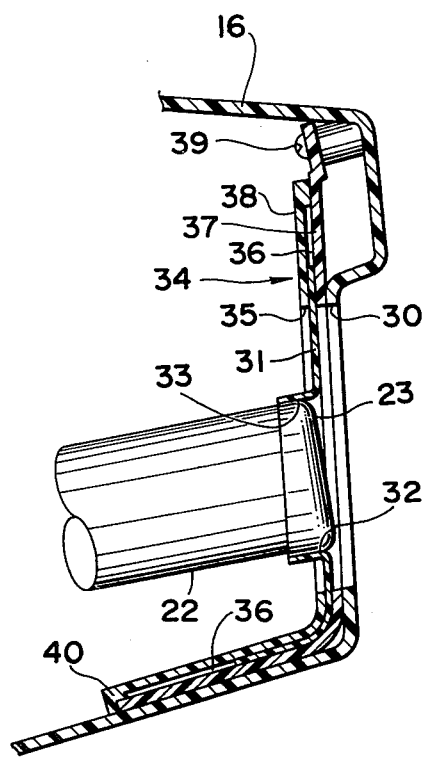
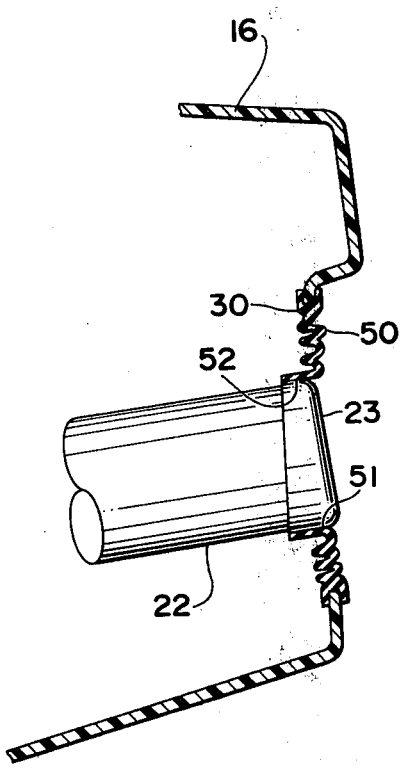

VEHICLE STEERING LOCK ARRANGEMENT

BACKGROUND OF THE INVENTION

This invention relates to a vehicle steering lock arrangement, and more particularly to a steering lock arrangement for a vehicle with a tilt steering wheel.

Some automotive vehicles are equipped with a combination ignition switch and steering-wheel lock. The lock device is mounted on a steering column usually at a position behind the steering wheel, so that operation of the ignition switch or the steering lock is sometimes obstructed by the steering wheel. In addition, if the combination switch and lock is applied to a vehicle with a tilt steering wheel, it may be necessary to provide an attractive arrangement of the lock which permits the lock to move with tilt of the steering wheel and column.

SUMMARY OF THE INVENTION

It is an object of the present invention to provide a vehicle steering lock arrangement which is easy to operate.

Another object of the present invention is to provide an attractive steering lock arrangement for a vehicle with a tilt steering wheel.

In accordance with the present invention, a steering lock arrangement for a vehicle with a steering wheel permitted to tilt within a predetermined range, includes a stationary instrument panel, a key-receiving member, and a shielding member. The instrument panel has an aperture. The key-receiving member is associated with the steering wheel and moves within a predetermined range as the steering wheel tilts. The key-receiving member has a slot for receiving a steering lock operating key, and is located at the back of the instrument panel in such a manner that the slot faces the aperture. The aperture has such dimensions that the slot will remain inside the boundary of the aperture, as seen substantially from the normal position of the vehicle driver, throughout the range of movement of the key-receiving member. The shielding member is connected to the key-receiving member and engages the instrument panel in such a manner as to cover the gap between the key-receiving member and the instrument panel to hide the back of the instrument panel. The shielding member is movable to permit movement of the key-receiving member while covering the gap.

The above and other objects, features and advantages of the present invention will be apparent from the following description of preferred embodiments thereof, taken in conjunction with the drawings.

BRIEF DESCRIPTION OF THE DRAWINGS

FIG. 3 is an enlarged sectional view taken along line III—III of FIG. 1; and

FIG. 4 is a sectional view similar to that of FIG. 3 and illustrating a steering lock arrangement of a second embodiment of the present invention.

DESCRIPTION OF THE PREFERRED EMBODIMENTS

Figure 1:
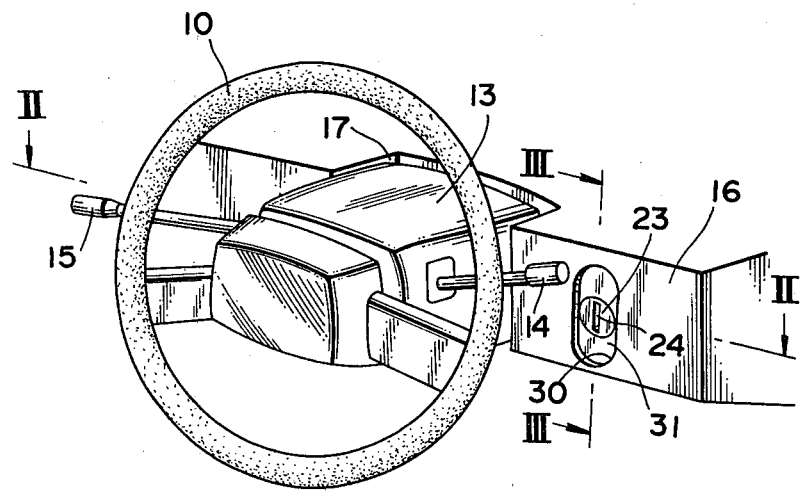
FIG. 1 is a perspective view of a steering lock arrangement for a vehicle with a tilt steering wheel, according to a first embodiment of the present invention.
Figure 2:
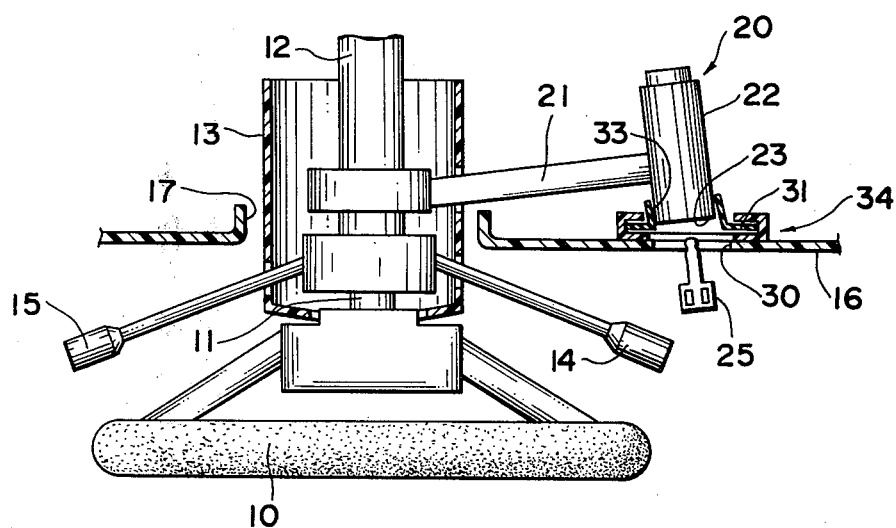
FIG. 2 is a sectional view taken along line II—II of FIG. 1.

With reference to FIGS. 1 to 3, there is shown a steering lock arrangement for a vehicle with a tilt steering wheel 10, according to a first embodiment of the present invention. The steering wheel 10 is mounted on the end of a steering shaft 11 extending coaxially through and projecting from a steering column 12. The steering wheel 10 is of the conventional tilt type, being adjustable in its tilt angle within a predetermined range. The steering column 12 essentially moves in a vertical plane as the steering wheel 10 tilts. The shaft 11 and column 12 are housed in a steering column cover 13.

The base of a turn indicator lever 14 is mounted on the column 12. The lever 14 extends approximately rightward through the cover 13 and terminates near the periphery of the wheel 10. The base of a dimmer or headlamp control switch lever 15 is also mounted on the column 12. The lever 15 extends approximately leftward through the cover 13. The levers 14 and 15 are in the rear of the wheel 10 as seen from the normal position of the vehicle driver.

A stationary instrument panel 16 extends laterally with respect to the vehicle and perpendicular to the steering column 12. The panel 16 is in the rear of the wheel 10, levers 14 and 15, as seen from the normal position of the driver. The panel 16 has a recess 17 accommodating the cover 13 containing the shaft 11 and column 12.

A combination ignition switch and steering-wheel lock 20 is mounted on the column 12 and is located at the back of the panel 16 as seen from the normal position of the driver. The lock 20 includes an arm 21 and a cylinder 22. One end of the arm 21 is connected to the column 12, the other end thereof being connected to the cylinder 22. The arm 21 is approximately parallel to the panel 16 and passes through the cover 13. The axis of the cylinder 22 is perpendicular to the arm 21 and essentially also to the panel 16. The arm 21 and the cylinder 22 are on the right-hand side of the column 12.

The end 23 of the cylinder 22 facing the panel 16 is located near the panel 16, and includes a slot 24 for receiving a key 25. The cylinder 22 serves as a key-receiving member. The lock 20 is designed in a conventional manner except for the length of the arm 21 which is greater that that of the conventional arm. The lock 20 further includes a lock mechanism (not shown) for the shaft 11 and thus the wheel 10. The lock mechanism is disposed in the column 12. The arm 21 houses a motion-transmitting member for actuating the lock mechanism via the key 25. An ignition switch (not shown) is also actuated by the key 25. Since the cylinder 22 is connected to the column 12 by means of the arm 21, the cylinder 22 moves essentially up or down in conjunction with the column 12 and the wheel 10. The cylinder 22 moves within a predetermined range defined by the range of tilt of the wheel 10.

The panel 16 has an aperture or window 30 at a position opposite the cylinder end 23, in order that the key 25 can be inserted into the slot 24 through the window 30. The cylinder end 23 is adjacent to the window 30 so that the key 25 can reach the slot 24. The window 30 is at a position substantially outside the circumference of the wheel 10 as seen from the direct front of the window 30, and is further from the column 12 than the free end of the lever 14 is. This configuration of the window 30 relative to the wheel 10 and the lever 14 ensures easy operation of the key 25, since the wheel 10 and the lever 14 do not obstruct the vehicle driver's movements of the key operation, i.e. insertion, draw, and turn of the key 25. The window 30 has such dimensions that the slot 24 in the cylinder end 23 will remain inside the boundary of the window 30, as seen substantially from the normal position of the driver, throughout the range of movement of the cylinder 22. Therefore, the key 25 can be inserted into the slot 24 through the window 30 regardless of the position of the cylinder 22 and thus that of the wheel 10. Specifically, since the cylinder 22 moves substantially up or down, the window 30 extends vertically and is slightly longer than the range of vertical movement of the cylinder 22. The window 30 has a width slightly greater than the outside diameter of the cylinder end 23.

The gap between the panel 16 and the cylinder end 23 seen through the window 30 is closed or covered by a sheet constituting a slide member 31 in order to shield the back of the panel 16 and enhance the appearance of the periphery of the cylinder end 23. The slide member 31 lies essentially parallel to the panel 16 and has a circular aperture 32 and a sleeve 33 around the periphery of the aperture 32. The sleeve 33 extends essentially perpendicular to the rest of the member 31 and backwards with respect to the panel 16. The inside diameter of the sleeve 33 is essentially equal to the outside diameter of the cylinder end 23 so that the cylinder end 23 fits firmly within the sleeve 33. In this way, the slide member 31 is attached to the cylinder end 23.

A guide 34 is attached to the back of the panel 16 around the window 30. The guide 34 has an aperture 35 of the same dimensions as those of the window 30 and aligned therewith. The guide 34 has a groove 36 at the perimetric inner surface thereof defining the aperture 35. Thus, the groove 36 extends around the aperture 35 and opens to the aperture 35. The groove 36 also extends parallel to the panel 16. The perimeter of the slide member 31 fits into the groove 36, which is slightly thicker than the slide member 31 to permit the latter to slide. The member 31 slides vertically along the groove 36 in conjunction with the cylinder 22 as the wheel 10 is tilted. The groove 36 has such a vertical dimension as to allow the slide member 31 to vertically move through its entire range of displacement defined by the range of tilt of the wheel 10. The horizontal dimension of the groove 36 is approximately equal to that of the slide member 31. The vertical dimension of the slide member 31 is so chosen that it will not come out of the groove 36 and thus hide the back of the panel 16, as seen from the front of the instrument panel 16, at all positions of the cylinder end 23, i.e. at all tilt angles of the wheel 10. In this way, the slide member 31 permits the cylinder 22 to move while continually covering the gap between the instrument panel 16 and the cylinder end 23, thus serving as a shielding member for the back of the panel 16.

The guide 34 includes parallel first and second sheets 37 and 38 through which the aperture 35 is formed. The first sheet 37 is screwed at 39 to the back of the panel 16 in a parallel manner. The second sheet 38 has a perimetric rim 40, which is bonded to the first member 37 so that the groove 36 will be formed between the first and second sheets 37 and 38.

Usually, the lower edge of the instrument panel 16 is bent frontward with respect to the vehicle so as to form an angle with the front face of the panel 16. The sheets 37 and 38 are curved at this angle to maintain the parallel relationship with the panel 16. Since the groove 36 is therefore curved, the slide member 31 is preferably made of flexible material in order to easily deform and follow the contour of the groove 36 through the curve, being smoothly movable along the groove 36. The material of the slide member 31 can be a flexible resin, such as an elastomeric polyester, e.g. "Belplene" (article name) made by TOYOBOSEKI Co., Ltd. In the case of a plane or flat groove 36, the slide member 31 may also be made of non-flexible material.

FIG. 4 shows an essential portion of a steering lock arrangement according to a second embodiment of the present invention. This steering lock arrangement is designed in a manner similar to that of the previous first embodiment except for the following design changes.

Bellows 50 are employed instead of the slide member 31 and the guide 34. The bellows 50 have a circular aperture 51 and an inwardly-extending sleeve 52 around the periphery of the aperture 51. The inside diameter of the sleeve 52 is essentially equal to the outside diameter of an end 23 of a cylinder 22 so that the end 23 fits snugly in the sleeve 52. The sleeve 52 of the bellows 50 is fixed to the cylinder end 23 with adhesive. The perimeter of the bellows 50 is shaped similar to that of an aperture or window 30 through an instrument panel 16. The perimeter of the bellows 50 is formed with a groove in which the panel 16 around the window 30 fits. The perimeter of the bellows 50 is fixed to the panel 16 with adhesive. In this way, the bellows 50 close or cover the gap between the cylinder end 23 and the panel 16 to hide the back of the panel 16, enhancing the appearance around the cylinder end 23. The bellows 50 are deformable to permit vertical movement of the cylinder 22 while continually covering the gap between the panel 16 and the cylinder end 23. The cylinder end 23 is essentially flush with the front face of the panel 16, so that at least part of the cylinder 22 is within the aperture 30. The vertical length of the aperture 30 is so chosen that the cylinder end 23 can move through the range of its displacement defined by the range of tilt of a steering wheel. In this case, the cylinder end 23 and thus a key-receiving slot formed at the end 23 face the front of the instrument panel 16.

It should be understood that further modifications and variations may be made in the present invention without departing from the spirit and scope of the present invention as set forth in the appended claims.

What is claimed is:

1. A steering lock arrangement for a vehicle with a steering wheel permitted to tilt within a predetermined range, comprising:

(a) a stationary instrument panel having an aperture;
   (b) a key-receiving member associated with the steering wheel and moving within a predetermined range as the steering wheel tilts, the key-receiving member having a slot for receiving a steering lock operating key, the key-receiving member being located at the back of the instrument panel in such a manner that the slot faces the aperture;
   (c) the aperture having such dimensions that the slot will remain inside the boundary of the aperture, as seen substantially from the normal position of the vehicle driver, throughout the range of movement of the key-receiving member; and
   (d) a shielding member connected to the key-receiving member and engaging the instrument panel in such a manner as to cover the gap between the key-receiving member and the instrument panel to hide the back of the instrument panel, the shielding member being mounted for movement to permit movement of the key-receiving member, the shielding member continually covering the gap during movement of the key receiving member.

2. A steering lock arrangement as recited in claim 1, further comprising a guide attached to the back of the instrument panel, the guide being provided therethrough with an aperture aligned with the aperture of the instrument panel, the guide having a groove in the surface defining the aperture of the guide, the perimeter of the shielding member fitting slideably within the groove to engage the instrument panel by means of the guide, the shielding member sliding along the groove to move as the steering wheel tilts.

3. A steering lock arrangement as recited in claim 2, wherein the shielding member is provided therethrough with an aperture and has a sleeve around the aperture, and wherein the key-receiving member extends approximately perpendicular to the instrument panel and has an end which faces the aperture of the instrument panel and has the slot, the end of the key-receiving member fitting firmly within the sleeve so that the shielding member will be connected to the key-receiving member.

4. A steering lock arrangement as recited in claim 2, wherein the groove is curved and the shielding member is flexible so as to follow the contour of the groove to be smoothly movable along the groove.

5. A steering lock arrangement as recited in claim 1, wherein the aperture is located substantially outside the circumference of the steering wheel as seen from the direct front of the aperture.

6. A steering lock arrangement for a vehicle with a steering wheel permitted to tilt within a predetermined range, comprising:
 (a) a stationary instrument panel having an aperture;
 (b) a key-receiving member associated with the steering wheel and moving within a predetermined range as the steering wheel tilts, the key-receiving member having a slot for receiving a steering lock operating key, at least part of the key-receiving member being within the aperture, the slot facing frontward with respect to the instrument panel;
 (c) the aperture having such dimensions as to permit the key-receiving member to move throughout the range of its movement; and
 (d) a shielding member connected to the key-receiving member and the instrument panel in such a manner as to cover the gap therebetween to hide the back of the instrument panel, the shielding member being deformable to permit movement of the key-receiving member, the shielding member continually covering the gap during movement of the key receiving member.

7. A steering lock arrangement as recited in claim 6, wherein the shielding member is composed of bellows.

8. A steering lock arrangement as recited in claim 7, wherein the shielding member is provided therethrough with an aperture and has a sleeve around the aperture of the shielding member, and wherein the key-receiving member extends approximately perpendicular to the instrument panel and has an end which faces forward with respect to the instrument panel and has the slot, the key-receiving member fitting into the sleeve and being fixed to the latter so that the shielding member will be connected to the key-receiving member.

9. A steering lock arrangement as recited in claim 8, wherein the shielding member is connected at the perimeter thereof to the instrument panel around the aperture of the instrument panel.

10. A steering lock arrangement as recited in claim 9, wherein the end of the key-receiving member is flush with the front face of the instrument panel.

* * * * *